US012169597B1

(12) United States Patent
Barel et al.

(10) Patent No.: US 12,169,597 B1
(45) Date of Patent: Dec. 17, 2024

(54) KEYBOARD WITH HAPTIC TRACKPAD

(71) Applicant: Microsoft Technology Licensing, LLC, Redmond, WA (US)

(72) Inventors: Eliyahu Barel, Rosh-HaAyin (IL); Ahia Peretz, Elkana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/490,656

(22) Filed: Oct. 19, 2023

(51) Int. Cl.
*G06F 3/01* (2006.01)
*G06F 3/02* (2006.01)
*G06F 3/041* (2006.01)
*G06F 3/044* (2006.01)

(52) U.S. Cl.
CPC ............ *G06F 3/016* (2013.01); *G06F 3/0213* (2013.01); *G06F 3/0416* (2013.01); *G06F 3/0447* (2019.05); *G06F 2203/04105* (2013.01)

(58) Field of Classification Search
None
See application file for complete search history.

(56) References Cited

U.S. PATENT DOCUMENTS

| | | | |
|---|---|---|---|
| 9,182,820 B1 | 11/2015 | Hebenstreit | |
| 9,448,631 B2* | 9/2016 | Winter | G06F 3/03547 |
| 10,509,471 B2 | 12/2019 | Dabic | |
| 10,775,889 B1* | 9/2020 | Lehmann | G01L 1/16 |
| 11,054,932 B2* | 7/2021 | Xu | G06F 3/0416 |
| 11,093,048 B1* | 8/2021 | Knoppert | G06F 3/0233 |
| 11,768,542 B1* | 9/2023 | Dani | G06F 3/0416 |
| | | | 345/174 |
| 2011/0012717 A1 | 1/2011 | Pance | |
| 2011/0084914 A1 | 4/2011 | Zalewski et al. | |
| 2011/0148607 A1 | 6/2011 | Zeleny | |
| 2012/0068957 A1 | 3/2012 | Puskarich | |
| 2013/0215079 A1 | 8/2013 | Johnson | |
| 2013/0241718 A1 | 9/2013 | Wang | |
| 2014/0267065 A1 | 9/2014 | Levesque | |
| 2014/0267076 A1 | 9/2014 | Birnbaum et al. | |
| 2014/0327653 A1 | 11/2014 | Schneider et al. | |
| 2014/0354587 A1 | 12/2014 | Mohindra et al. | |
| 2015/0116205 A1* | 4/2015 | Westerman | G06F 3/04847 |
| | | | 345/156 |
| 2015/0130730 A1* | 5/2015 | Harley | G06F 3/016 |
| | | | 345/173 |

(Continued)

FOREIGN PATENT DOCUMENTS

JP 2022081856 A 6/2022

*Primary Examiner* — Matthew Yeung
(74) *Attorney, Agent, or Firm* — Alleman Hall & Tuttle LLP

(57) ABSTRACT

Keyboard and trackpad configurations and related methods utilize data from one or more bending sensors to adjust a driving signal for a haptic actuator on a haptic trackpad. In one example, a method for adjusting a driving signal for a haptic actuator on a force-sensing haptic trackpad in a deformable keyboard includes using at least data from a bending sensor to determine that the keyboard is bending. At least on condition of determining that the keyboard is bending, the method includes using the data from the bending sensor to adjust an initial haptic driving signal to an adjusted haptic driving signal. The haptic actuator is driven with the adjusted driving signal to generate haptic output via a touch receiving surface of the force-sensing haptic trackpad.

20 Claims, 10 Drawing Sheets

(56) References Cited

U.S. PATENT DOCUMENTS

| | | |
|---|---|---|
| 2016/0188103 A1 | 6/2016 | Bernstein et al. |
| 2016/0202760 A1 | 7/2016 | Churikov |
| 2016/0259411 A1 | 9/2016 | Yoneoka et al. |
| 2017/0285748 A1 | 10/2017 | Evans, V |
| 2018/0039331 A1 | 2/2018 | Warren |
| 2018/0081441 A1 | 3/2018 | Pedder |
| 2018/0181205 A1 | 6/2018 | Cruz-hernandez et al. |
| 2018/0218859 A1* | 8/2018 | Ligtenberg ......... H03K 17/9622 |
| 2018/0292904 A1 | 10/2018 | Muller et al. |
| 2020/0213768 A1 | 7/2020 | Lee |
| 2020/0303140 A1 | 9/2020 | Porcella et al. |
| 2021/0081045 A1 | 3/2021 | Mukherjee et al. |
| 2021/0157408 A1 | 5/2021 | Karimi Eskandary et al. |
| 2021/0333923 A1* | 10/2021 | Matsubara .............. G06F 1/169 |
| 2022/0214751 A1 | 7/2022 | Miller |
| 2022/0221936 A1 | 7/2022 | Park |
| 2022/0221938 A1 | 7/2022 | Chen |
| 2022/0283641 A1 | 9/2022 | Chen |
| 2022/0297354 A1 | 9/2022 | Davila-Peralta |
| 2022/0365601 A1 | 11/2022 | Zhao et al. |
| 2022/0391016 A1 | 12/2022 | Cody |
| 2023/0126612 A1 | 4/2023 | Gajiwala |
| 2023/0266829 A1* | 8/2023 | Sathe ................. G06F 3/03547 345/168 |
| 2024/0143079 A1* | 5/2024 | Glad ...................... H10N 30/88 |

\* cited by examiner

KEYBOARD WITH HAPTIC TRACKPAD

BACKGROUND

Some keyboards include a haptic trackpad for providing haptic feedback to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating keyboards, haptic trackpad configurations and related methods that utilize data from one or more bending sensors to adjust a driving signal for a haptic actuator on a haptic trackpad. In one example, a method for adjusting a driving signal for a haptic actuator on a force-sensing haptic trackpad in a deformable keyboard includes using at least data from a bending sensor to determine that the keyboard is bending. At least on condition of determining that the keyboard is bending, the method includes using the data from the bending sensor to adjust an initial haptic driving signal to an adjusted haptic driving signal. The haptic actuator is driven with the adjusted driving signal to generate haptic output via a touch receiving surface of the force-sensing haptic trackpad.

DETAILED DESCRIPTION

Some computing devices are communicatively coupled to a keyboard with a trackpad for receiving user inputs. In some of these keyboards, the trackpad is coupled to one or more haptic components that are configured to generate vibrations in the trackpad. For example, in some devices one or more conductive coils, linear resonant actuators (LRAs), or other haptic components are coupled to the trackpad and configured to vibrate the trackpad to provide haptic feedback to a user.

Some keyboards can utilize a thin form factor and lightweight materials that reduce available packaging space and can limit structural integrity. In such flexible keyboards that include a haptic trackpad, certain use cases can cause bending of the keyboard and generate internal forces that can dampen and diminish the haptic feedback generated by the haptic components in the trackpad and perceived by the user. Examples can include two or more fingers pressing with significant force on the trackpad, a palm resting on the trackpad, and a user resting the keyboard on one leg and placing both palms on opposite sides of the keyboard to induce bending in the keyboard. In these different user scenarios, inconsistent haptic feedback levels caused by keyboard bending can result in less than satisfactory user experiences.

Accordingly, in one potential advantage of the present disclosure and as described in more detail below, configurations of the present disclosure provide keyboard and trackpad configurations and related methods that utilize data from one or more bending sensors to adjust a driving signal for a haptic actuator on a haptic trackpad in a deformable keyboard. As described in more detail below, keyboards of the present disclosure utilize a bending sensor to determine that the keyboard is bending, and use data from the bending sensor to adjust an initial haptic driving signal. The haptic actuator is then driven with the adjusted driving signal to generate haptic output via the touch receiving surface of the trackpad.

Figure 1:
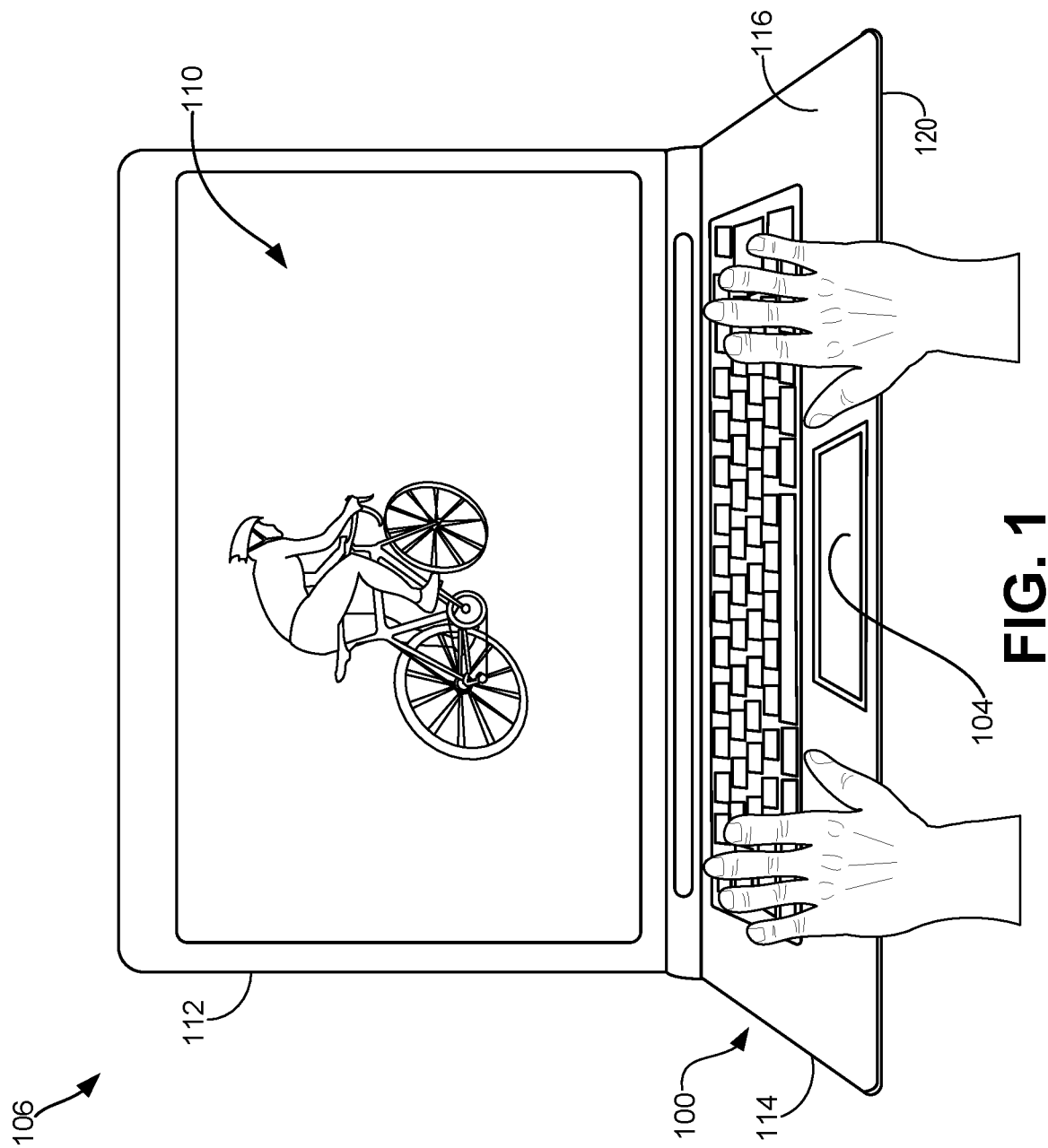
FIG. 1 shows one example of a computing device utilizing a keyboard and haptic trackpad according to examples of the present disclosure.
Figure 2:
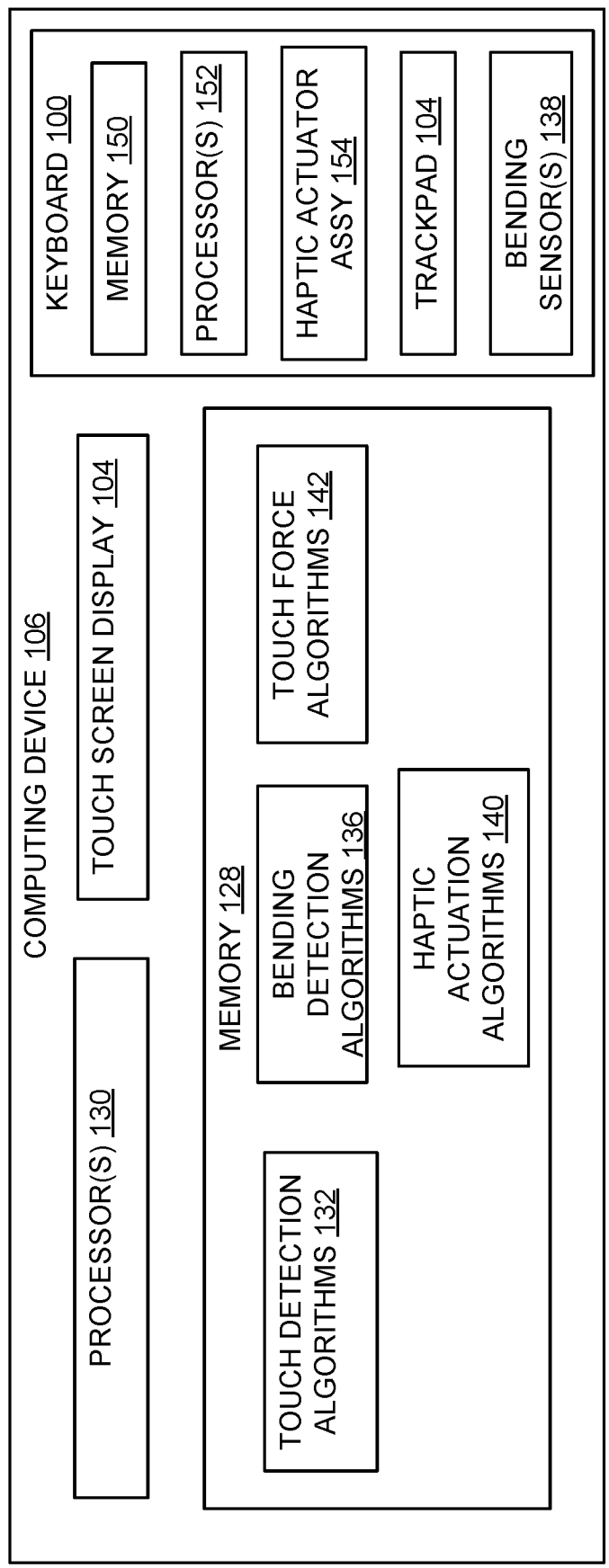
FIG. 2 shows a schematic view of components of the computing device and keyboard of FIG. 1 according to examples of the present disclosure.

With reference now to FIGS. 1 and 2, an example of a deformable keyboard 100 with a force-sensing haptic trackpad 104 and associated computing device 106 in the form of a laptop computer is illustrated. In this example computing device 106 includes a touch screen display 110 on a display substrate 112 that is rotatably coupled to a chassis 114 of the keyboard 100. Chassis 114 includes a user interaction surface 116 that comprises the haptic trackpad 104, keys of the keyboard 100, and an opposing rear cover 120. In different examples a user provides touch inputs to the trackpad 104 by touching the trackpad with one or more digits or other portions of the user's hand(s).

In some examples, keyboard 100 is detachable from display substrate 112 to enable the user to use the keyboard in various positions separated from the touch screen display 110. In some examples, deformable keyboards of the present disclosure can be utilized with and/or implemented in a variety of computing devices, such as desktop computing devices, tablet computing devices, foldable computing devices including multiple touch screens, wearable and other mobile computing devices.

Trackpad 104 is configured to detect the position and force of a user's finger(s), thumb, or other body part contacting the trackpad. In some examples the trackpad 104 is a mutual capacitance trackpad. In these examples, touch inputs are identified by sampling capacitance between a driving electrode and a sensing electrode in an upper layer of the trackpad. Driving electrodes are arranged in an array within trackpad 104. Touch detection signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples and as described further below, trackpads employing other touch detection technologies, including but not limited to differential capacitance, self-capacitance, and projected capacitance touch detection, can be utilized.

With reference now to FIG. 2, a schematic view of selected components of the example computing device 106 and keyboard 100 of FIG. 1 is provided. Computing device 106 includes memory 128 that stores instructions executable by one or more processors 130. For example, the memory 128 stores instructions in the form of touch detection algorithms 132 executable by processor(s) 130 to perform touch detection on the trackpad 104 using signals received from the trackpad.

As described in more detail below, memory 128 also stores instructions in the form of bending detection algorithms 136 executable by the processor 130 to determine that the keyboard is bending via data received from one or more bending sensors 138 in the keyboard 100. At least on condition that the keyboard is bending, haptic actuation algorithms 140 are executable by the processor 130 to receive and process data from the bending sensor(s) 138 to adjust an initial haptic driving signal to an adjusted haptic driving signal. In this example, memory 128 also stores instructions in the form of touch force algorithms 142 executable by the processor 130 to determine the force of a touch input on the trackpad 104. Additional details regarding memory 128, processor(s) 130, and other components and subsystems of computing device 106 are described further below with reference to FIG. 11.

As described in more detail below, keyboard 100 comprises a haptic actuator assembly 154 that receives driver signals from the haptic actuation algorithms 140. In some examples, keyboard 100 includes memory 150 that stores instructions executable by a processor(s) 152 to perform keyboard-related and trackpad-related functions. In some examples, the instructions take the form of touch detection algorithms 132, bending detection algorithms 136, haptic actuation algorithms 140, and/or touch force algorithms 142 as described herein.

Figure 3:
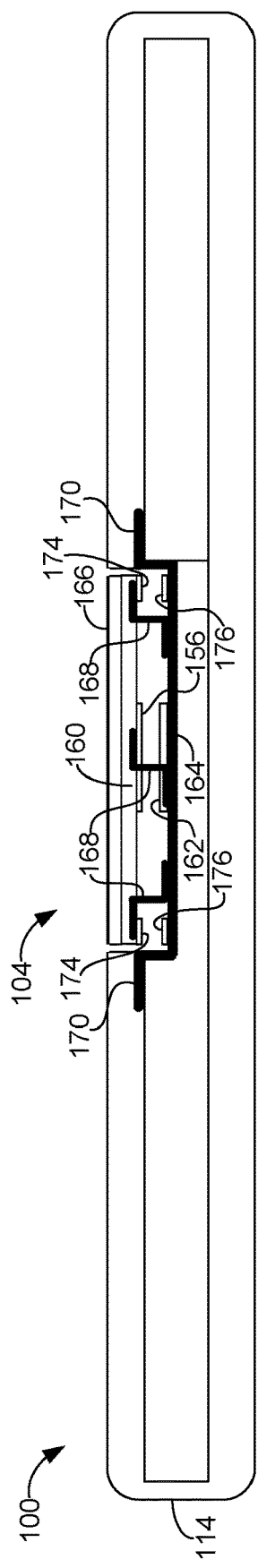
FIG. 3 shows a partial cross-section view of one example of the keyboard of FIG. 1.
Figure 4:
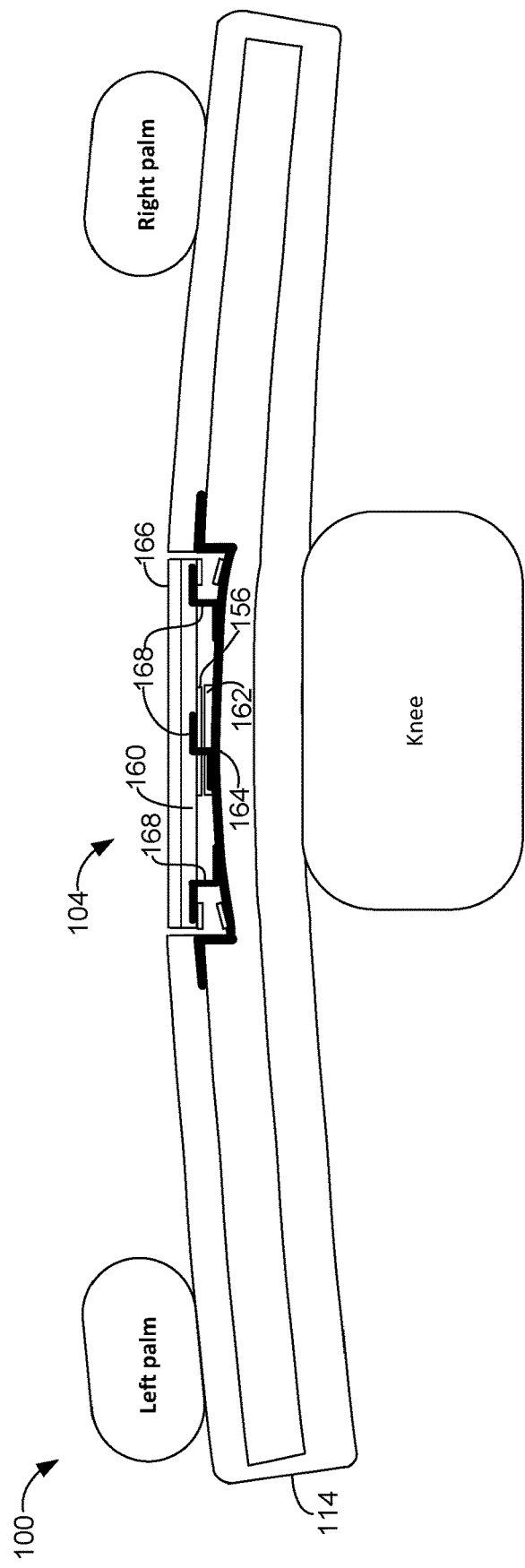
FIG. 4 shows the keyboard of FIG. 3 in a bending use case.

With reference now to FIGS. 3 and 4, schematic partial cross sections of one example of keyboard 100 that utilizes bending sensors in the form of capacitive electrodes are illustrated. In this example, chassis 114 is fabricated from one or more deformable materials, such as plastic, aluminum, magnesium, or other material having a measure of flexibility. In this example, the haptic actuator assembly 154 comprises a conductive coil 156 formed on or affixed to a printed circuit board (PCB) 160 of the trackpad 104, and at least one magnet 162 rigidly affixed to a base plate 164. Conductive coil 156 and magnet 162 are configured to produce user-perceptible vibrations in the touch-receiving surface of the trackpad.

As described further below, in this example trackpad 104 utilizes capacitance measurements to estimate a force applied to the trackpad. The trackpad 104 includes a touch-receiving surface 166 that is coupled to the PCB 160. In some examples, the touch receiving surface 166 is a non-deformable touch receiving surface, such as a cover glass assembly. PCB 160 is supported by resilient members 168, such as springs, over base plate 164 that is connected to electrical ground. In this example the base plate 164 is coupled to the chassis 114 via base plate arms 170.

With reference to FIG. 4, in one example use case a user can support a middle section of the deformable keyboard chassis 114 on her knee while resting her left and right palms on either side of the keyboard. As shown in FIG. 4, these forces cooperate to bend the chassis 114 and components of the trackpad 104, such as the base plate 164. Such forces also stretch and compress the resilient members 168 by different amounts, which alters the elasticity and spring force of the resilient members and imposes tensile and compressive forces and moments on the PCB 160 and touch receiving surface 166. These forces correspondingly inhibit the acceleration of the conductive coil 156 and dampen and diminish the haptic feedback generated by these haptic components as compared to the more neutral position of the keyboard in FIG. 3.

In some examples and configurations, bending the keyboard can also cause one or more components to contact the PCB 160, thereby creating a frictional contact that further resists movement and acceleration of the PCB 160 and touch receiving surface 166. In the example of FIG. 4, in some examples the magnet 162 can contact coil 156 on the PCB 160. As noted above, in these and other user scenarios that bend the keyboard 100, inconsistent haptic feedback levels can cause less than satisfactory user experiences.

Accordingly, and in one potential advantage of the present disclosure, data from one or more bending sensors is utilized to adjust a driving signal for the haptic actuator(s) on the haptic trackpad 104 to accommodate for the effects of keyboard bending and provide more consistent haptic feedback across a variety of use cases of the keyboard. As described further below, in the present example keyboard 100 utilizes a bending sensor in the form of a plurality of sensing pads (capacitive electrodes) to determine that the keyboard is bending and uses data from the electrodes to adjust an initial haptic driving signal and drive the haptic actuator with the adjusted driving signal to generate haptic output via the touch receiving surface.

As described further below and with reference to FIG. 3, in this example trackpad 104 utilizes capacitance measurements from two PCB electrodes 174 affixed to the PCB 160 and two opposing base electrodes 176 affixed to the base plate 164 to determine keyboard bending. Additionally, in some examples the touch force algorithms 142 utilize the electrodes to estimate a force applied to the trackpad. The capacitance between a PCB electrode 174 and its opposing base electrode 176 on the grounded base plate 164 is a function of the distance between them. In these examples, a capacitive force transducer can utilize displacement as a proxy for force. In such a parallel plate capacitor model, the capacitance is equal to the area of the electrode divided by the distance between the electrode and the base plate 164. When a force applied to the cover glass assembly compresses the resilient members 168 and reduces this distance, the capacitance changes. In this model, the capacitance is directly proportional to the applied force.

In one example, where the area of an electrode is represented by $A_{pad}$, the initial distance between the electrode and the base plate 164 is do, and the change in the distance as a result of a force F applied by a user is d(F)=F/K, the capacitance as a result of the Force F is given by the equation:

$$\text{Capacitance (Force)} = \varepsilon \frac{A_{pad}}{d_0 - d(F)} = \varepsilon \frac{A_{pad}}{d_0 - \frac{F}{K}},$$

where K is the spring constant of the spring (resilient members) between the PCB and the base plate 164, F is the force applied by the user on the trackpad, and ε is the permittivity of the medium in the gap between the electrode and the base plate 164. In this manner, a measured change in capacitance can be used to calculate the magnitude of the applied force F to the touch receiving surface 166.

Advantageously, and in one potential advantage of the present disclosure, in the configuration of FIGS. 3 and 4 the bending sensor(s) 138 comprise the PCB electrodes 174 and their corresponding base electrodes 176. In this manner, the bending detection algorithms 136 can utilize data from the electrodes indicating a capacitance change between the PCB electrodes and the base electrodes to determine that keyboard 100 is bending. At least on condition of determining that the keyboard is bending, the algorithms use data from the electrodes to adjust an initial haptic driving signal to an adjusted haptic driving signal that compensates for the detected keyboard bending. The haptic actuation algorithms 140 then use the adjusted driving signal to drive the haptic actuator and generate haptic output via the touch receiving surface 166. In this example and as described further below, using two PCB electrodes 174 and corresponding base electrodes 176 on opposing ends of the PCB 160 and base plate 164, respectively, provides capacitance data at multiple locations to allow for more precise determinations of keyboard bending behavior. In other examples, three or more pairs of PCB electrodes 174 and base electrodes 176 can be utilized. In another example, a single PCB electrode 174 and corresponding base electrode 176 can be utilized.

In different examples, the bending detection algorithms 136 can employ a variety of techniques to utilize data from the electrodes to determine the adjusted haptic driving signal. In some examples, capacitance changes detected at the PCB electrodes 174 can be utilized with a look up table to select an adjusted haptic driving signal corresponding to the capacitance change. In some examples, the bending detection algorithms 136 can utilize machine learning algorithms to determine an adjusted haptic driving signal that corresponds to a particular capacitance change.

Figure 5:
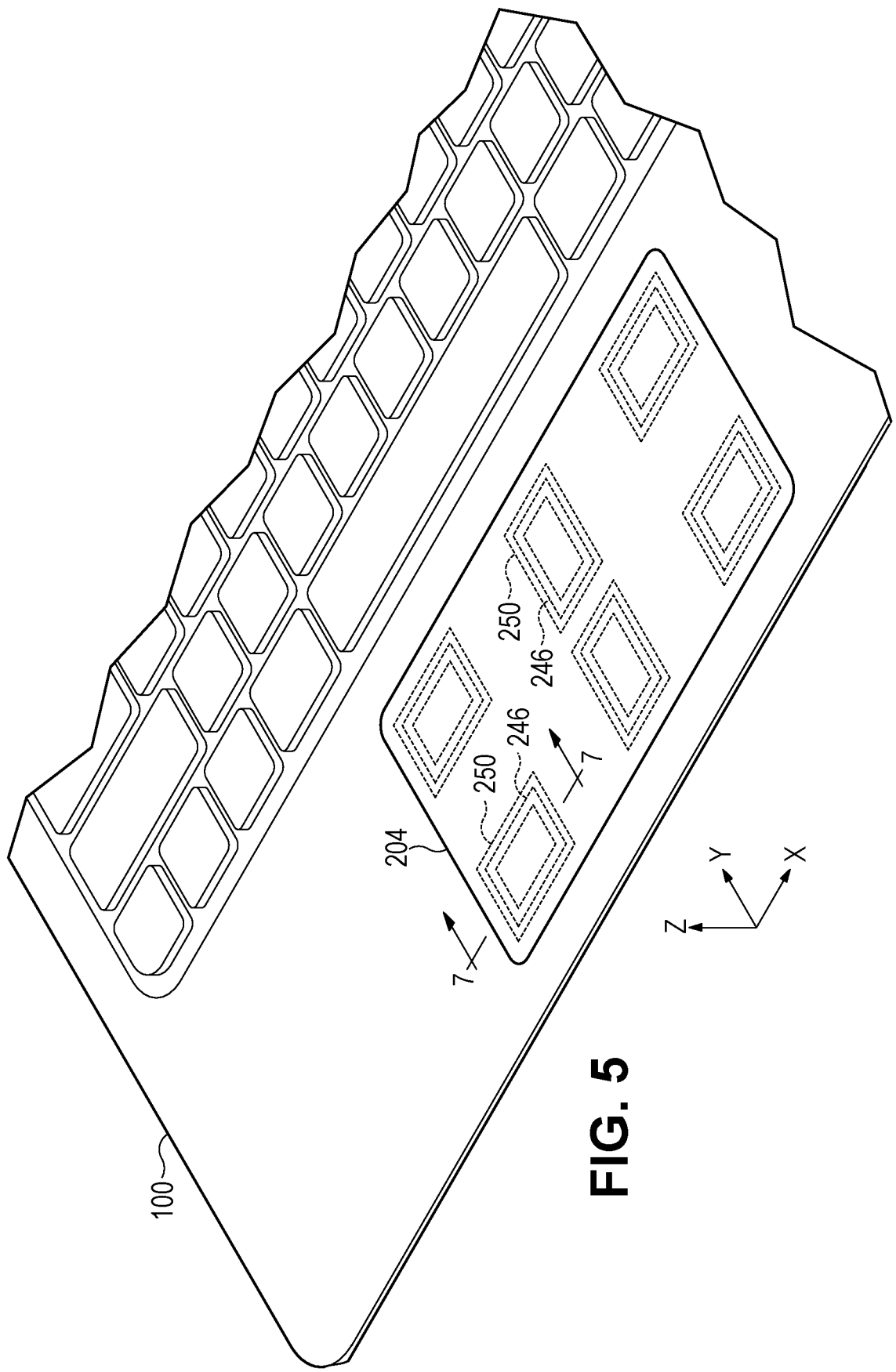
FIG. 5 shows a partial view of another example keyboard and trackpad according to examples of the present disclosure.
Figure 6:
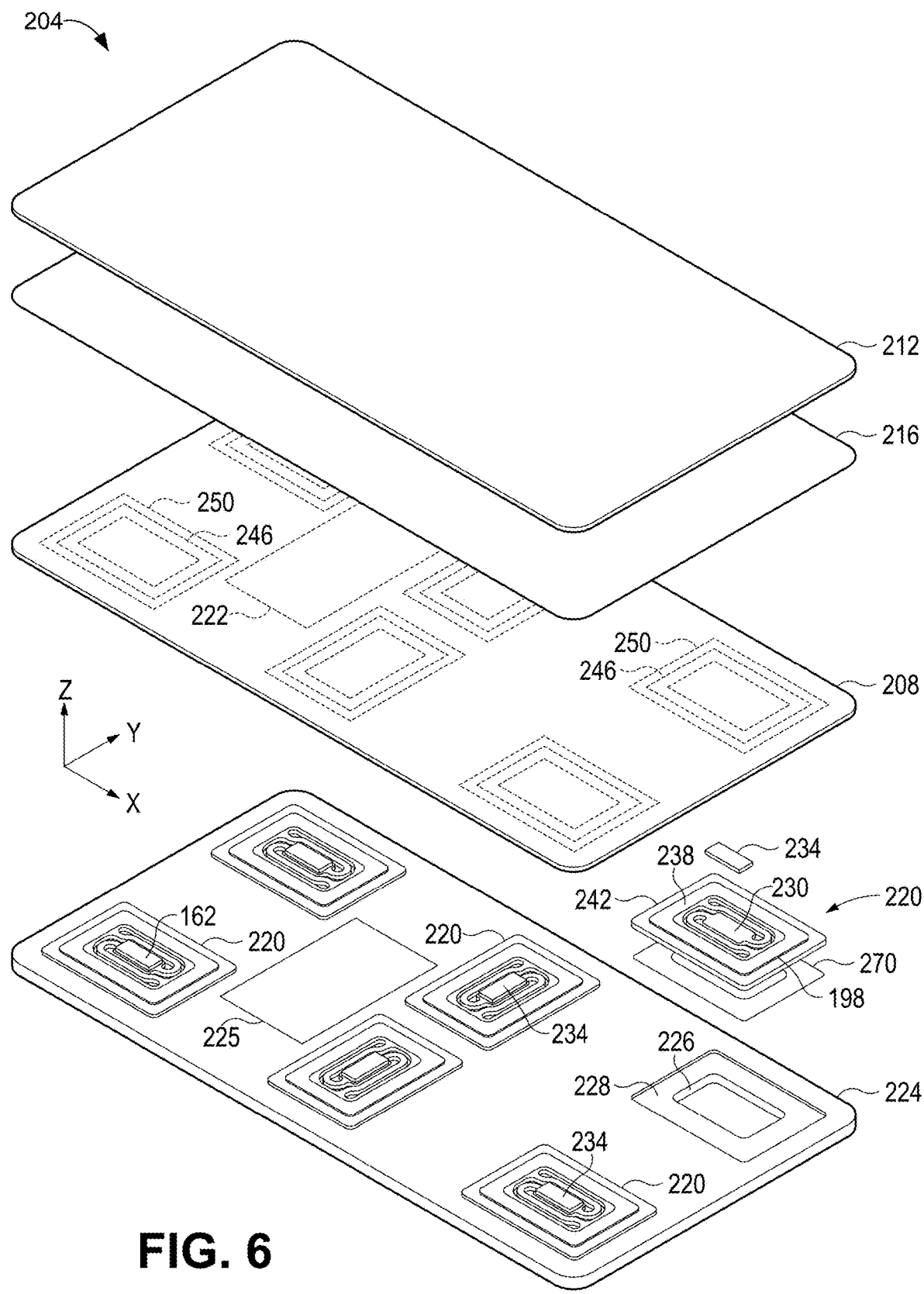
FIG. 6 shows a partial exploded view of the trackpad in the keyboard of FIG. 5.
Figure 7:
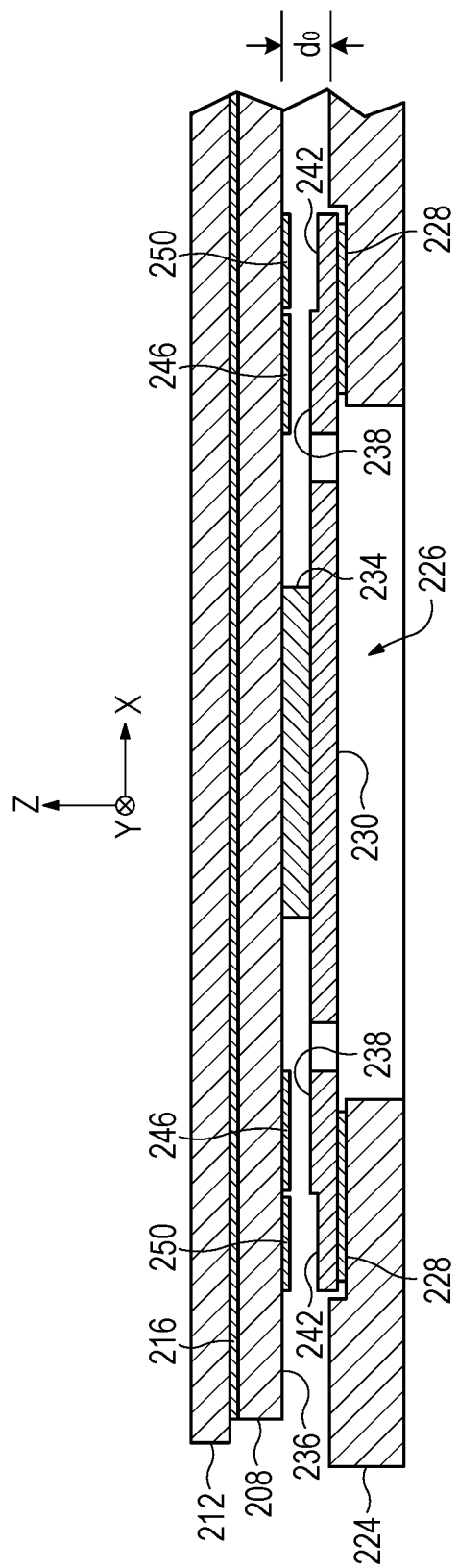
FIG. 7 shows a partial cross-section view of the trackpad of FIG. 5 taken along line 7-7 in FIG. 5.

In some examples, the bending detection algorithms 136 are configured to determine that a keyboard is bending at least by using data from PCB electrodes and base electrodes to detect a gap change between the PCB and the base plate. With reference now to FIGS. 5-7, components of another example trackpad 204 that utilizes differential capacitive sensing to determine a base height do between the PCB and the base plate are illustrated. Trackpad 204 can be utilized with keyboard 100 described above or any other suitable keyboard. In this example and with reference to FIG. 6, trackpad 204 includes a PCB 208 affixed to a cover glass layer 212 by an adhesive layer 216. PCB 208 is supported by a plurality of springs 220 located on a base plate 224. In this example, trackpad 204 utilizes six springs 220 to support the PCB 208 and provide gap change detection and keyboard bending detection as described further below. In other examples, trackpads of the present disclosure can utilize fewer or more springs. Additionally and as illustrated in FIG. 6, a haptic actuator 222 is coupled to PCB 208 and a corresponding magnet 225 is located on the base plate 224.

With reference to the simplified cross section illustrated in FIG. 7, each spring 220 comprises a central portion 230 that is resiliently supported by two beams extending from opposing internal walls of the spring. A spacer 234 is located between the central portion 230 and a lower metal layer 236 of PCB 208. In some examples, spacer 234 comprises a silicone bump that includes an embedded conductive bead that provides grounding of the spring 220 to facilitate capacitive measurements.

With reference to FIG. 6, the base plate 224 defines six apertures 226 that each correspond to one of the springs 220. As shown in FIGS. 6 and 7, at each aperture 226 the base plate 224 comprises a recessed shelf 228 that surrounds the aperture. A spring 220 is affixed to each recessed shelf 228 of the base plate 224. A central portion 230 of the spring 220 is positioned over a corresponding aperture 226 in the base plate 224. In this manner, each spring 220 resiliently supports PCB 224 in a manner that enables the PCB to move in the z-axis direction in response to a force exerted on the cover glass layer 212.

With reference also to the simplified cross section of FIG. 7, in the present example each spring 220 comprises an inner rectangular spring electrode 238 and an outer rectangular spring electrode 242 surrounding and concentric with the inner rectangular spring electrode. With reference to FIG. 6, in this example the inner rectangular spring electrode 238 and the outer rectangular spring electrode 242 are affixed to the recessed shelf 228 of the base plate 224 via adhesive layer 270. PCB 208 includes corresponding PCB electrodes that are each spaced from and overlying one of the spring electrodes of a spring 220. In the present example the PCB electrodes comprise an inner rectangular PCB electrode 246 and an outer rectangular PCB electrode 250 surrounding and concentric with the inner rectangular PCB electrode. Accordingly and as shown in FIG. 7, the inner rectangular PCB electrode 246 is spaced from and overlies the inner spring electrode 238, and the outer rectangular PCB electrode 250 is spaced from and overlies the outer spring electrode 242.

As shown in FIGS. 6 and 7, in this example the outer spring electrode 242 of each spring 220 is stepped down in the z-axis direction with respect to the inner spring electrode 238. In this manner and as illustrated in FIG. 7, a first distance between the inner spring electrode 238 and the inner PCB electrode 246 is less than a second distance between the outer spring electrode 242 and the outer PCB electrode 250. It follows that the capacitance between the inner spring electrode 238 and the inner PCB electrode 246 is also different from the outer spring electrode 242 and the outer PCB electrode 250.

Advantageously, this differential capacitance between the two pairs of electrodes at each spring 220 can be used to determine changes in the base height do at each spring and corresponding bending of the keyboard. With this configuration, the bending detection algorithms 136 can determine that the keyboard is bending at least by using data from the electrodes to detect a gap change in the base height do between the PCB 208 and the base plate 224. In some examples, this configuration is also utilized to provide force sensing using differential capacitive force sensing techniques.

As described above, the bending detection algorithms 136 can use this data from the electrodes to adjust an initial haptic driving signal to an adjusted haptic driving signal that compensates for the detected keyboard bending. The haptic actuation algorithms 140 then use the adjusted driving signal to drive the haptic actuator and generate haptic output via the touch receiving surface 166.

Additionally and in another potential advantage of this configuration, in some examples the bending detection algorithms 136 can detect a first gap change between the PCB and the base plate at a first location, and detect a second gap change different than the first gap change between the PCB and the base plate at a second location. For example, a first gap change at one of the springs 220 in the middle of the base plate 224 and a second gap change at one of the springs 220 on either end of the base plate can be utilized to determine that the keyboard is bending and adjust the haptic driving signal accordingly. In some examples, such as the bending behavior illustrated in FIG. 4, the first gap change in the middle of the base plate 224 is a decrease in distance between the PCB 208 and the base plate from a neutral gap, such as the gap do shown in FIG. 7, and the second gap change at one end of the base plate is an increase in distance between the PCB 208 and the base plate. Advantageously, by detecting multiple different gap changes at different locations of the trackpad 204, more precise estimates of keyboard bending behavior (such as bending geometry, three-dimensional shape changes, and other characteristics) can be determined and utilized to provide adjusted driving signals that provide more consistent haptic feedback across a range of bending scenarios.

It will be appreciated that in other examples, keyboards and trackpads of the present disclosure can utilize other configurations of springs and spring electrodes including any suitable number of springs and corresponding apertures in a base plate, as well as different configurations of spring electrodes and corresponding PCB electrodes.

Figure 8:
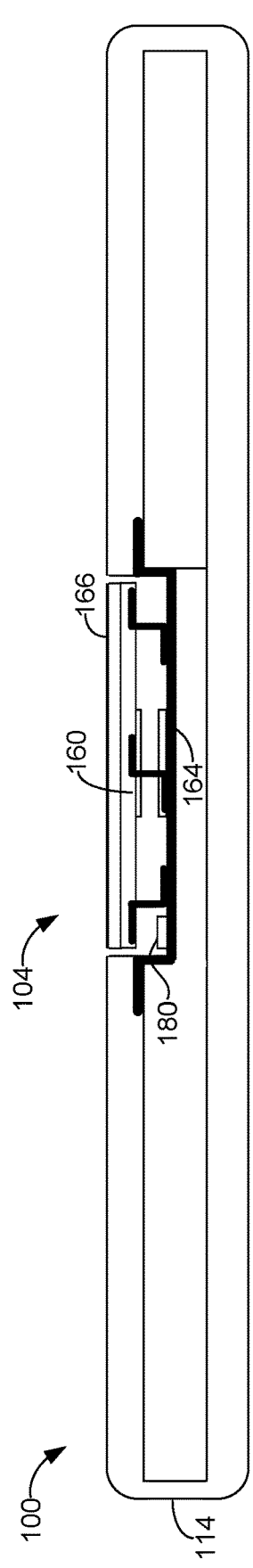
FIG. 8 shows a partial cross-section view of another configuration of the keyboard of FIG. 1 according to examples of the present disclosure.

In some examples, keyboards of the present disclosure can utilize a haptic trackpad that includes one or more bending sensors comprising a sensing device mounted to the base plate or the chassis. In one example and with reference to FIG. 8, keyboard 100 includes strain gauge 180 that measures the deflection or deformation of the base plate 164. Using at least data from the strain gauge 180, the bending detection algorithms 136 can determine that the keyboard 100 is bending and adjust an initial haptic driving signal to an adjusted haptic driving signal to compensate for the effects of such bending on the haptic output produced by the haptic actuator and transmitted via the touch receiving surface 166.

In one potential advantage of this configuration, a measurement of the actual, mechanical bending/deflection of the base plate 164 can be determined and utilized to select an adjusted haptic driving signal, such as from a corresponding look up table. In other examples, two or more strain gauges can be affixed to the base plate 164 and utilized to adjust a haptic driving signal as discussed above. In other examples, a variety of other sensing devices that measure deflection/deformation of the base plate 164 can be utilized.

Figure 9:
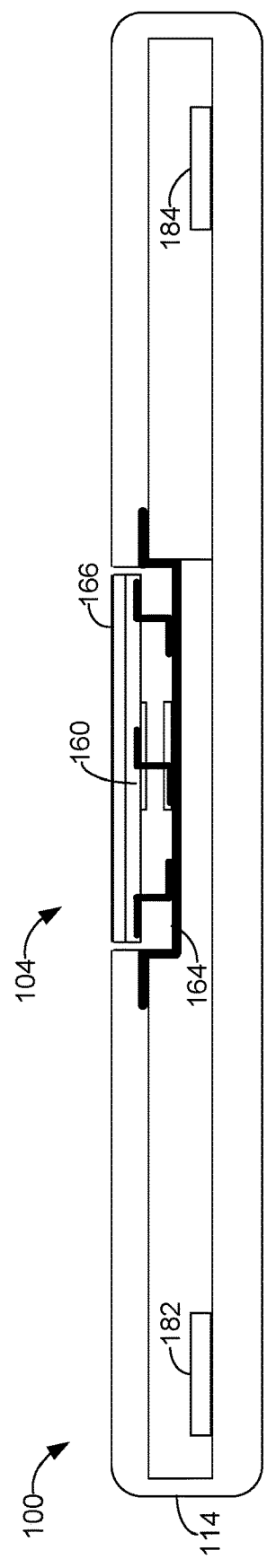
FIG. 9 shows a partial cross-section view of another configuration of the keyboard of FIG. 1 according to examples of the present disclosure.

In other examples, one or more sensing devices can be mounted to other portion(s) of a keyboard to detect and measure bending of the keyboard. In one example and with reference to FIG. 9, keyboard 100 includes a first strain gauge 182 that measures the deflection or deformation of the keyboard chassis 114 at a first location, and a second strain gauge 184 that measures the deflection/deformation of the keyboard chassis 114 at a second location on an opposing end of the chassis. Using at least data from these strain gauges, the bending detection algorithms 136 can determine that the keyboard is bending and adjust an initial haptic driving signal to an adjusted haptic driving signal to compensate for the effects of such bending on the haptic output produced by the haptic actuator and transmitted via the touch receiving surface 166.

In one potential advantage of this configuration, separate measurements of actual, mechanical bending/deflection of the chassis 114 at opposing ends of the chassis can be determined and utilized to determine a more precise estimation of the bending behavior of the chassis, and correspondingly to select an adjusted haptic driving signal, such as from a look up table. In other examples, a variety of other sensing devices that measure deformation of the chassis 114 can be utilized.

In some examples, the bending detection algorithms 136 and haptic actuation algorithms 140 can operate to adjust the haptic driving signal at least in response to determining that a user is touching the touch receiving surface of the trackpad. For example, touch detection algorithms 132 can determine that a user is touching the touch receiving surface of the trackpad. At least on condition of determining that the user is touching the touch receiving surface and determining that the keyboard is bending as described above, data from the bending sensor is used to adjust an initial haptic driving signal to an adjusted haptic driving signal. In one potential advantage of this configuration, by utilizing a touch detection to trigger a bending determination, adjustments of the haptic driving signal can be performed in real time and in close temporal proximity to a touch event that may trigger haptic feedback.

In some examples, the bending detection algorithms 136 and haptic actuation algorithms 140 can operate to pre-condition the haptic driving signal prior to a user touch event on the touch receiving surface of the trackpad. For example, touch detection algorithms 132 can determine that a user is not touching the touch receiving surface of the trackpad. At least on condition of determining that the user is not touching the touch receiving surface, data from the bending sensor is used to adjust an initial haptic driving signal to a pre-conditioned haptic driving signal.

Next, touch detection algorithms 132 determine that a user is touching the touch receiving surface. At least on condition of determining that a user is touching the touch receiving surface, the haptic actuation algorithms 140 use the pre-conditioned haptic driving signal to drive the haptic actuator to generate haptic output via the touch receiving surface. In one potential advantage of this configuration and in some use cases, by using data from the bending sensor to pre-condition the haptic driving signal prior to a user touching the trackpad, the pre-conditioned haptic driving signal can be promptly provided to the haptic actuator assembly 154 when a touch event is detected, thereby avoiding the step of determining another adjusted haptic driving signal and providing faster, more consistent haptic output to a user.

Figure 10A:
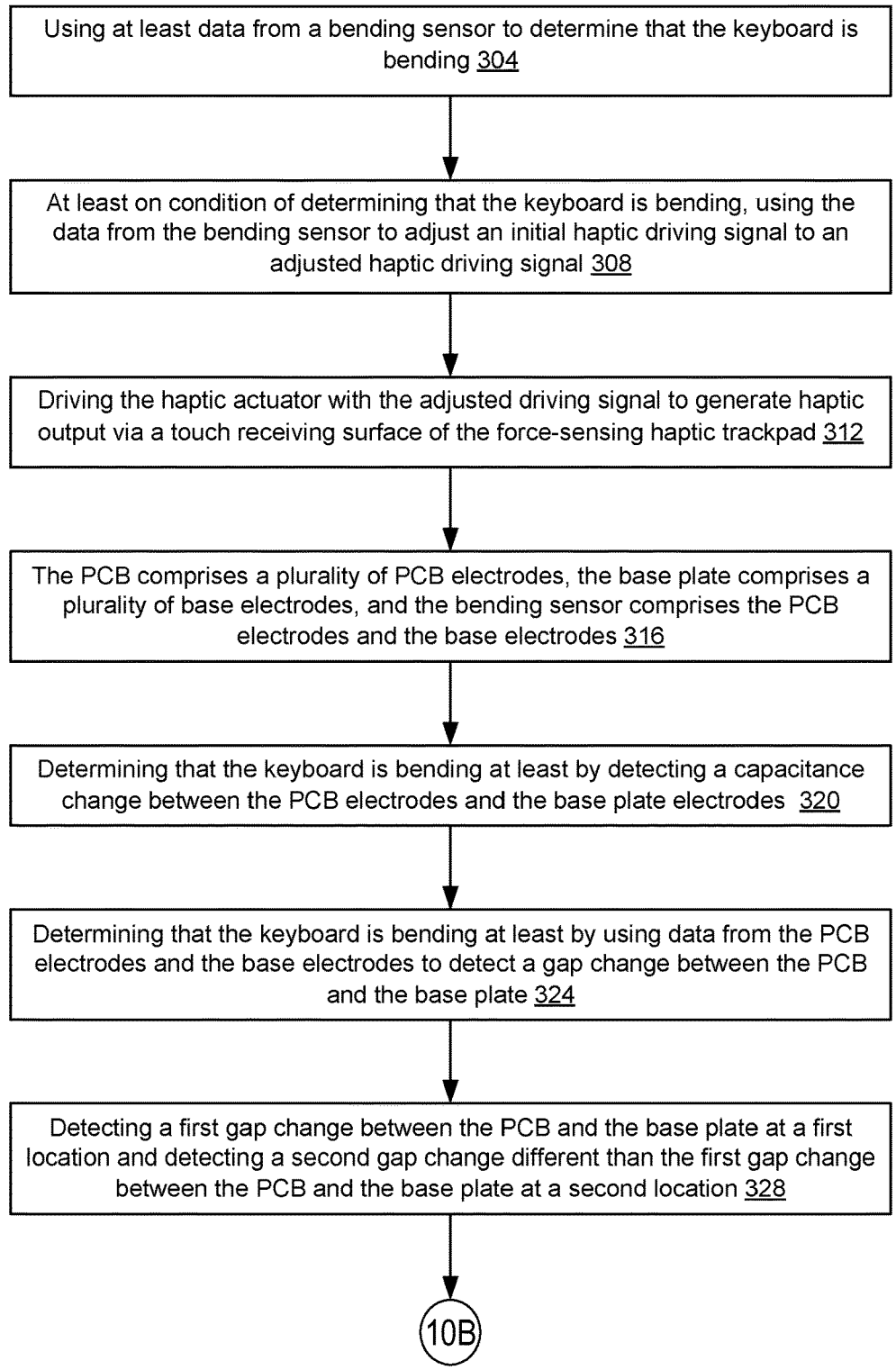
FIGS. 10A and 10B show a flow diagram of an example method for adjusting a driving signal for a haptic actuator on a force-sensing haptic trackpad in a deformable keyboard according to examples of the present disclosure.
Figure 10B:
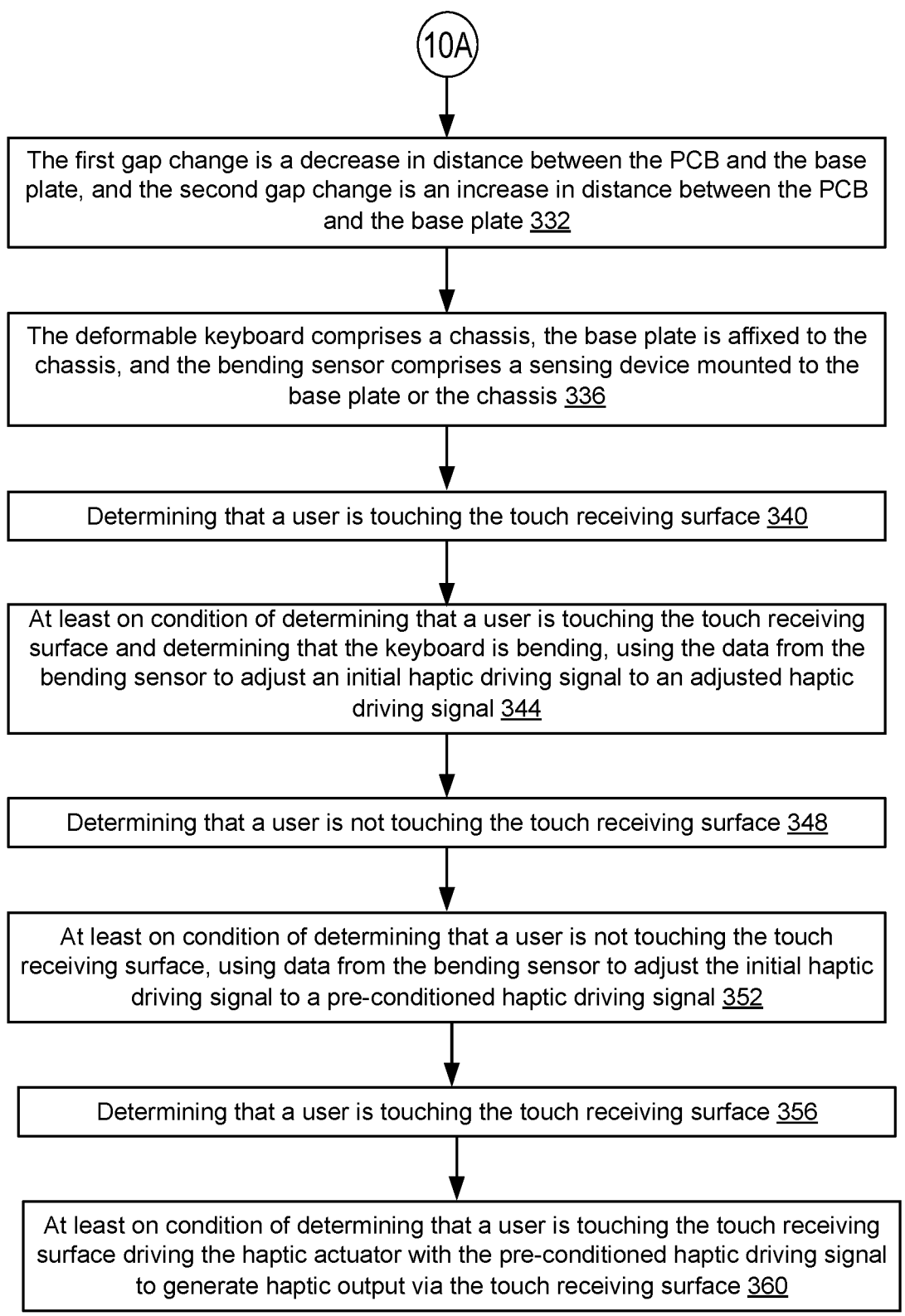

With reference now to FIGS. 10A and 10B, a flow diagram is provided depicting an example method 300 for adjusting a driving signal for a haptic actuator on a force-sensing haptic trackpad in a deformable keyboard according to examples of the present disclosure. The following description of method 300 is provided with reference to the keyboard 100, trackpads 104, 204 and other components described herein and shown in FIGS. 1-9 and 11. In other examples, the method 300 is performed with other configurations of keyboards and in other contexts using other suitable devices and components.

At 304 and with reference also to FIG. 10A, method 300 includes using at least data from a bending sensor to determine that the keyboard is bending. At 308 method 300 includes, at least on condition of determining that the keyboard is bending, using the data from the bending sensor to adjust an initial haptic driving signal to an adjusted haptic driving signal. At 312 method 300 includes driving the haptic actuator with the adjusted driving signal to generate haptic output via a touch receiving surface of the force-sensing haptic trackpad. At 316 method 300 includes, wherein the PCB comprises a plurality of PCB electrodes, the base plate comprises a plurality of base electrodes, and the bending sensor comprises the PCB electrodes and the base electrodes.

At 320 method 300 includes determining that the keyboard is bending at least by detecting a capacitance change between the PCB electrodes and the base electrodes. At 324 method 300 includes determining that the keyboard is bending at least by using data from the PCB electrodes and the base electrodes to detect a gap change between the PCB and the base plate. At 328 method 300 includes detecting a first gap change between the PCB and the base plate at a first location and detecting a second gap change different than the first gap change between the PCB and the base plate at a second location.

With reference now to FIG. 10B, at 332 method 300 includes wherein the first gap change is a decrease in distance between the PCB and the base plate, and the second gap change is an increase in distance between the PCB and the base plate. At 336 method 300 includes wherein the deformable keyboard comprises a chassis, the base plate is affixed to the chassis, and the bending sensor comprises a sensing device mounted to the base plate or the chassis. At 340 method 300 includes determining that a user is touching the touch receiving surface. At 344 method 300 includes, at least on condition of determining that a user is touching the touch receiving surface and determining that the keyboard is bending, using the data from the bending sensor to adjust an initial haptic driving signal to an adjusted haptic driving signal.

At 348 method 300 includes determining that a user is not touching the touch receiving surface. At 352 method 300 includes, at least on condition of determining that the user is not touching the touch receiving surface, using data from the bending sensor to adjust the initial haptic driving signal to a pre-conditioned haptic driving signal. At 356 method 300 includes determining that a user is touching the touch receiving surface. At 360 method 300 includes, at least on condition of determining that the user is touching the touch receiving surface, driving the haptic actuator with the pre-conditioned haptic driving signal to generate haptic output via the touch receiving surface.

Figure 11:
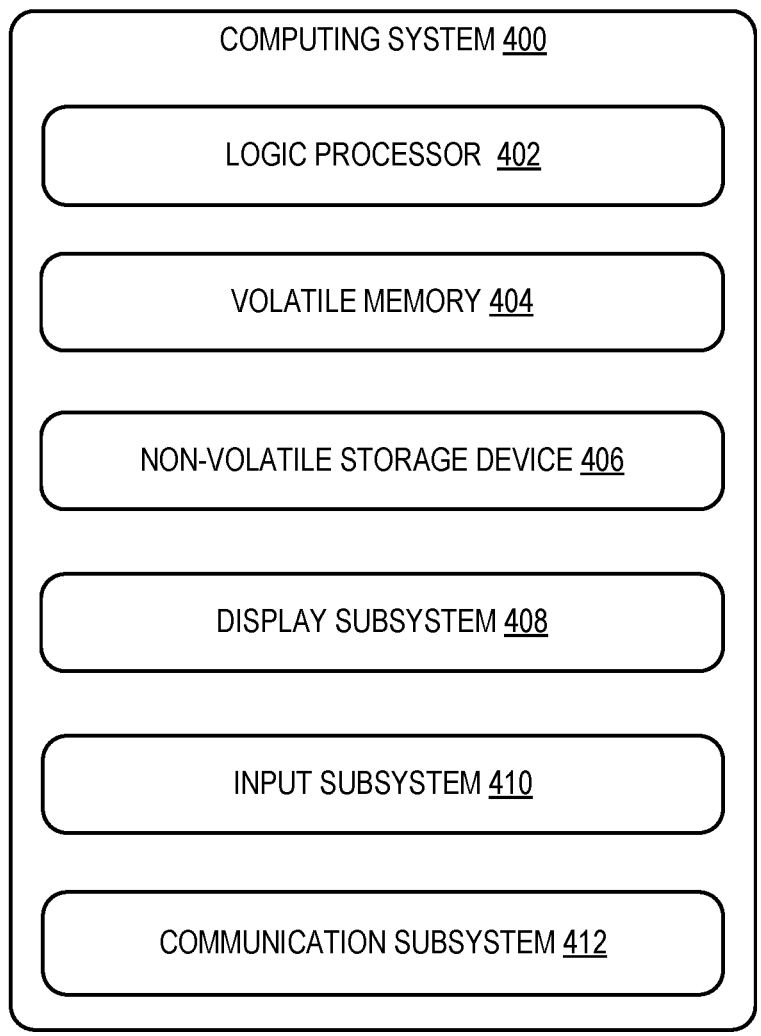
FIG. 11 shows a block diagram of an example computing system according to examples of the present disclosure.

In some embodiments, the keyboards, trackpads, and components described herein may include and/or be utilized with a computing system embodying different computing aspects and comprising one or more computing devices. FIG. 11 schematically shows a simplified representation of a computing system 400 configured to provide any to all of the compute functionality described herein. Computing system 400 is shown in simplified form. The keyboard 100, trackpads 104, 204 and computing device 106 described above may comprise computing system 400 or one or more aspects of computing system 400.

Computing system 400 includes a logic processor 402, volatile memory 404, and a non-volatile storage device 406. Computing system 400 may optionally include a display subsystem 408, input subsystem 410, communication subsystem 412, and/or other components not shown in FIG. 11.

Logic processor 402 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 404 may include physical devices that include random access memory (RAM). Volatile memory 404 is typically utilized by logic processor 402 to temporarily store information during processing of software instructions. It will be appreciated that volatile memory 404 typically does not continue to store instructions when power is cut to the volatile memory 404.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 408 may be used to present a visual representation of data held by non-volatile storage device 406. As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

Input subsystem 410 may comprise or interface with one or more user-input devices such as trackpad 104, touch screen display 110, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a deformable keyboard, comprising: a force-sensing haptic trackpad comprising: a touch receiving surface; a haptic actuator coupled to the touch receiving surface; and a printed circuit board (PCB) coupled to the touch receiving surface; a base plate spaced from the PCB; a plurality of resilient members coupling the base plate to the PCB; a bending sensor configured to detect bending of the keyboard; a processor; and a memory storing instructions executable by the processor to: use at least data from the bending sensor to determine that the keyboard is bending; at least on condition of determining that the keyboard is bending, use the data from the bending sensor to adjust an initial haptic driving signal to an adjusted haptic driving signal; and drive the haptic actuator with the adjusted driving signal to generate haptic output via the touch receiving surface. The keyboard may additionally or alternatively include, wherein the PCB comprises a plurality of PCB electrodes, the base plate comprises a plurality of base electrodes, and the bending sensor comprises the PCB electrodes and the base electrodes. The keyboard may additionally or alternatively include, wherein the instructions are executable to determine that the keyboard is bending at least by detecting a capacitance change between the PCB electrodes and the base electrodes. The keyboard may additionally or alternatively include, wherein the instructions are executable to determine that that the keyboard is bending at least by using data from the PCB electrodes and the base electrodes to detect a gap change between the PCB and the base plate. The keyboard may additionally or alternatively include, wherein the instructions are executable to detect a first gap change between the PCB and the base plate at a first location and detect a second gap change different than the first gap change between the PCB and the base plate at a second location. The keyboard may additionally or alternatively include, wherein the first gap change is a decrease in distance between the PCB and the base plate, and the second gap change is an increase in distance between the PCB and the base plate. The keyboard may additionally or alternatively include, wherein the keyboard comprises a chassis, the base plate is affixed to the chassis, and the bending sensor comprises a sensing device mounted to the base plate or the chassis. The keyboard may additionally or alternatively include, wherein the instructions are further executable to: determine that a user is touching the touch receiving surface; and at least on condition of determining that a user is touching the touch receiving surface and determining that the keyboard is bending, use the data from the bending sensor to adjust an initial haptic driving signal to an adjusted haptic driving signal. The keyboard may additionally or alternatively include, wherein the instructions are further executable to: determine that a user is not touching the touch receiving surface; at least on condition of determining that a user is not touching the touch receiving surface, use data from the bending sensor to adjust the initial haptic driving signal to a pre-conditioned haptic driving signal; determine that a user is touching the touch receiving surface; and at least on condition of determining that a user is touching the touch receiving surface, drive the haptic actuator with the pre-conditioned haptic driving signal to generate haptic output via the touch receiving surface. The keyboard may additionally or alternatively include, wherein the touch receiving surface is a non-deformable touch receiving surface.

Another aspect provides a method for adjusting a driving signal for a haptic actuator on a force-sensing haptic trackpad in a deformable keyboard, the method comprising: using at least data from a bending sensor to determine that the keyboard is bending; at least on condition of determining that the keyboard is bending, using the data from the bending sensor to adjust an initial haptic driving signal to an adjusted haptic driving signal; and driving the haptic actuator with the adjusted driving signal to generate haptic output via a touch receiving surface of the force-sensing haptic trackpad. The method may additionally or alternatively include, wherein the PCB comprises a plurality of PCB electrodes, the base plate comprises a plurality of base electrodes, and the bending sensor comprises the PCB electrodes and the base electrodes. The method may additionally or alternatively include determining that the keyboard is bending at least by detecting a capacitance change between the PCB electrodes and the base electrodes. The method may additionally or alternatively include determining that the keyboard is bending at least by using data from the PCB electrodes and the base electrodes to detect a gap change between the PCB and the base plate. The method may additionally or alternatively include detecting a first gap change between the PCB and the base plate at a first location and detecting a second gap change different than the first gap change between the PCB and the base plate at a second location. The method may additionally or alternatively include, wherein the first gap change is a decrease in distance between the PCB and the base plate, and the second gap change is an increase in distance between the PCB and the base plate. The method may additionally or alternatively include, wherein the keyboard comprises a chassis, the base plate is affixed to the chassis, and the bending sensor comprises a sensing device mounted to the base plate or the chassis. The method may additionally or alternatively include, determining that a user is touching the touch receiving surface; and at least on condition of determining that a user is touching the touch receiving surface and determining that the keyboard is bending, using the data from the bending sensor to adjust an initial haptic driving signal to an adjusted haptic driving signal. The method may additionally or alternatively include determining that a user is not touching the touch receiving surface; at least on condition of determining that the user is not touching the touch receiving surface, using data from the bending sensor to adjust the initial haptic driving signal to a pre-conditioned haptic driving signal; determining that a user is touching the touch receiving surface; and at least on condition of determining that the user is touching the touch receiving surface, driving the haptic actuator with the pre-conditioned haptic driving signal to generate haptic output via the touch receiving surface.

Another aspect provides a deformable keyboard, comprising: a force-sensing haptic trackpad comprising: a non-deformable touch receiving surface; a haptic actuator coupled to the touch receiving surface; and a printed circuit board (PCB) coupled to the touch receiving surface; a base plate spaced from the PCB; a plurality of resilient members coupling the base plate to the PCB; a bending sensor configured to detect bending of the keyboard; a processor; and a memory storing instructions executable by the processor to: use at least data from the bending sensor to determine that the keyboard is bending; at least on condition of determining that the keyboard is bending, use the data from the bending sensor to adjust an initial haptic driving signal to an adjusted haptic driving signal; and drive the haptic actuator with the adjusted driving signal to generate haptic output via the touch receiving surface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A deformable keyboard, comprising:
   a force-sensing haptic trackpad comprising:
      a touch receiving surface;
      a haptic actuator coupled to the touch receiving surface; and
      a printed circuit board (PCB) coupled to the touch receiving surface;
   a base plate spaced from the PCB;
   a plurality of resilient members coupling the base plate to the PCB;
   a bending sensor configured to detect bending of the keyboard;
   a processor; and
   a memory storing instructions executable by the processor to:
      use at least data from the bending sensor to determine that the keyboard is bending;
      at least on condition of determining that the keyboard is bending, use the data from the bending sensor to adjust an initial haptic driving signal to an adjusted haptic driving signal; and
      drive the haptic actuator with the adjusted driving signal to generate haptic output via the touch receiving surface.

2. The keyboard of claim 1, wherein the PCB comprises a plurality of PCB electrodes, the base plate comprises a plurality of base electrodes, and the bending sensor comprises the PCB electrodes and the base electrodes.

3. The keyboard of claim 2, wherein the instructions are executable to determine that the keyboard is bending at least by detecting a capacitance change between the PCB electrodes and the base electrodes.

4. The keyboard of claim 2, wherein the instructions are executable to determine that that the keyboard is bending at least by using data from the PCB electrodes and the base electrodes to detect a gap change between the PCB and the base plate.

5. The keyboard of claim 4, wherein the instructions are executable to detect a first gap change between the PCB and the base plate at a first location and detect a second gap change different than the first gap change between the PCB and the base plate at a second location.

6. The keyboard of claim 5, wherein the first gap change is a decrease in distance between the PCB and the base plate, and the second gap change is an increase in distance between the PCB and the base plate.

7. The keyboard of claim 1, wherein the keyboard comprises a chassis, the base plate is affixed to the chassis, and the bending sensor comprises a sensing device mounted to the base plate or the chassis.

8. The keyboard of claim 1, wherein the instructions are further executable to:
   determine that a user is touching the touch receiving surface; and
   at least on condition of determining that a user is touching the touch receiving surface and determining that the keyboard is bending, use the data from the bending sensor to adjust an initial haptic driving signal to an adjusted haptic driving signal.

9. The keyboard of claim 1, wherein the instructions are further executable to:
   determine that a user is not touching the touch receiving surface;
   at least on condition of determining that a user is not touching the touch receiving surface, use data from the bending sensor to adjust the initial haptic driving signal to a pre-conditioned haptic driving signal;
   determine that a user is touching the touch receiving surface; and
   at least on condition of determining that a user is touching the touch receiving surface, drive the haptic actuator with the pre-conditioned haptic driving signal to generate haptic output via the touch receiving surface.

10. The keyboard of claim 1, wherein the touch receiving surface is a non-deformable touch receiving surface.

11. A method for adjusting a driving signal for a haptic actuator on a force-sensing haptic trackpad in a deformable keyboard, the method comprising:
   using at least data from a bending sensor to determine that the keyboard is bending;
   at least on condition of determining that the keyboard is bending, using the data from the bending sensor to adjust an initial haptic driving signal to an adjusted haptic driving signal; and
   driving the haptic actuator with the adjusted driving signal to generate haptic output via a touch receiving surface of the force-sensing haptic trackpad.

12. The method of claim 11, wherein the PCB comprises a plurality of PCB electrodes, the base plate comprises a plurality of base electrodes, and the bending sensor comprises the PCB electrodes and the base electrodes.

13. The method of claim 12, further comprising determining that the keyboard is bending at least by detecting a capacitance change between the PCB electrodes and the base electrodes.

14. The method of claim 12, further comprising determining that the keyboard is bending at least by using data from the PCB electrodes and the base electrodes to detect a gap change between the PCB and the base plate.

15. The method of claim 14, further comprising detecting a first gap change between the PCB and the base plate at a first location and detecting a second gap change different than the first gap change between the PCB and the base plate at a second location.

16. The method of claim 15, wherein the first gap change is a decrease in distance between the PCB and the base plate, and the second gap change is an increase in distance between the PCB and the base plate.

17. The method of claim 11, wherein the keyboard comprises a chassis, the base plate is affixed to the chassis, and the bending sensor comprises a sensing device mounted to the base plate or the chassis.

18. The method of claim 11, further comprising:
determining that a user is touching the touch receiving surface; and
at least on condition of determining that a user is touching the touch receiving surface and determining that the keyboard is bending, using the data from the bending sensor to adjust an initial haptic driving signal to an adjusted haptic driving signal.

19. The method of claim 11, further comprising:
determining that a user is not touching the touch receiving surface;
at least on condition of determining that the user is not touching the touch receiving surface, using data from the bending sensor to adjust the initial haptic driving signal to a pre-conditioned haptic driving signal;
determining that a user is touching the touch receiving surface; and
at least on condition of determining that the user is touching the touch receiving surface, driving the haptic actuator with the pre-conditioned haptic driving signal to generate haptic output via the touch receiving surface.

20. A deformable keyboard, comprising:
a force-sensing haptic trackpad comprising:
a non-deformable touch receiving surface;
a haptic actuator coupled to the touch receiving surface; and
a printed circuit board (PCB) coupled to the touch receiving surface;
a base plate spaced from the PCB;
a plurality of resilient members coupling the base plate to the PCB;
a bending sensor configured to detect bending of the keyboard;
a processor; and
a memory storing instructions executable by the processor to:
use at least data from the bending sensor to determine that the keyboard is bending;
at least on condition of determining that the keyboard is bending, use the data from the bending sensor to adjust an initial haptic driving signal to an adjusted haptic driving signal; and
drive the haptic actuator with the adjusted driving signal to generate haptic output via the touch receiving surface.

* * * * *